Dec. 29, 1953    J. C. ROSE    2,664,259
HANGER
Filed July 21, 1950

JESS C. ROSE
INVENTOR.

BY
ATTORNEY.

Patented Dec. 29, 1953

2,664,259

UNITED STATES PATENT OFFICE 2,664,259

HANGER

Jess C. Rose, North Hollywood, Calif., assignor to J. G. McAlister, Inc., Hollywood, Calif., a corporation of California Application July 21, 1950, Serial No. 175,061

1 Claim. (Cl. 248—337)

This invention relates to a hanger, and particularly to a hanger for suspending lamps or other lighting equipment from a ceiling or other overhead support. While the invention has a wide field of utility, in fact wherever it is sought to suspend an article or device at adjustable elevations from an overhead support, it is of particular advantage for use in motion picture and television studios where it is desirable to hang the lighting equipment from the ceiling in order to keep the floor clear for free movement of camera and other equipment. Studio stages are usually equipped with an overhead pipe structure for the suspension of lighting and other equipment to keep the floor as nearly uninterruptedly clear as possible. This invention is herein described and illustrated as applied to an adjustable hanger for such motion picture and television studio use.

It is an object of the invention to provide a hanger which may be readily adjustable for suspending the lamp or other supported device at varying elevations above the floor as may be desired. It is another object to provide such an adjustable hanger which is safe and sure in its action, and of sturdy, simple construction.

It is still another object to provide such an adjustable hanger in which the operator may lower the suspended article at an automatically controlled speed and stop the descending movement accurately at any desired elevation.

In the drawing of the studio hanger described and illustrated herein as one embodiment of the invention:

Figure 1:
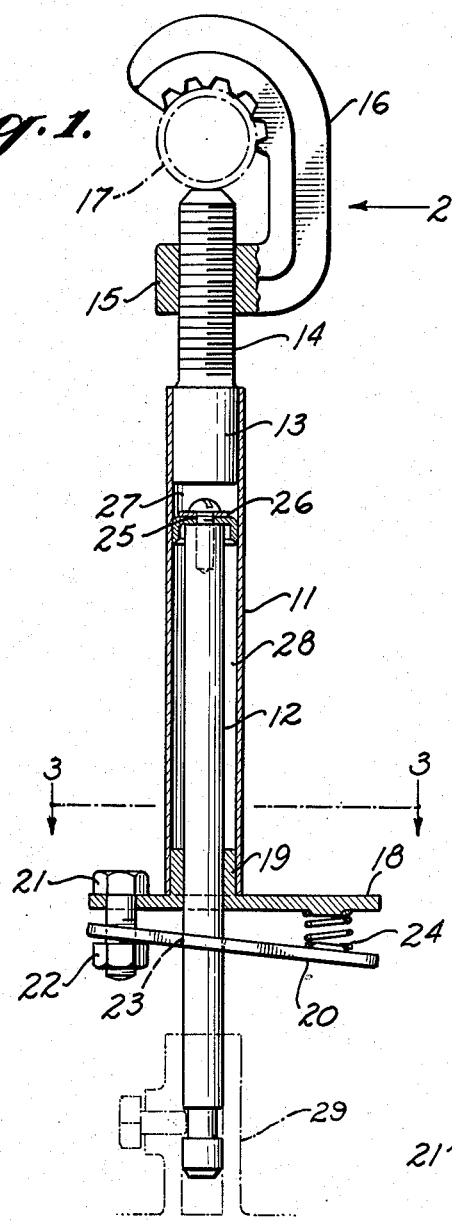
Figure 1 is a side elevation, partly in section, of the hanger.
Figure 2:
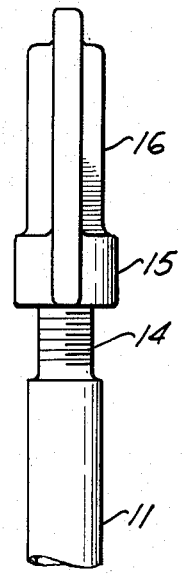
Figure 2 is an elevational view of the upper portion of the hanger taken in the direction indicated by the arrow 2 of Figure 1.
Figure 3:
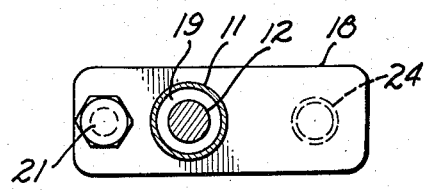
Figure 3 is a horizontal sectional view taken along the line 3—3 of Figure 1.

The hanger consists of two principal parts, a tube 11 and a rod 12 which is vertically movable within and with respect to the tube 11. The tube is secured at its upper end to a head 13 of a set screw 14, by welding or any other means which will afford an airtight joint between the tube and screw head. The set screw 14 threadedly engages an arm 15 of a pipe clamp 16 for fixing the position of the hanger on a pipe 17 of the overhead pipe grid system of a motion picture or television studio. The hanger may be moved horizontally along the pipe 17 or transferred to some other location on the pipe grid, by rotating the tube 11 in the direction to loosen the set screw 14, moving the hanger to its new position and again tightening the set screw.

A plate 18 is fixedly secured to the lower end of tube 11. This plate is apertured to receive and snugly fit the rod 12 and is formed with an upturned cylindrical flange 19 which both acts as a bearing bushing for the rod 12 and affords a means for welding or otherwise securing the tube 11 to the plate 18.

A second plate 20 is suspended below plate 18 by a bolt 21 which passes through a hole in a leftward projection of plate 18 and hangs downwardly therefrom. Plate 20 has a hole in its left end through which bolt 21 passes. The plate 20 is supported at this left end by a nut 22 on the bolt 21. The diameter of the bolt hole in plate 20 is slightly larger than that of the bolt 21 to permit the plate to assume positions at a small inclination to the horizontal. Plate 20 has also an aperture 23 through which passes rod 12. Aperture 23 is just enough greater in diameter than the rod 12 to permit the plate to assume a slight obtuse angle to the axis of the rod. At this angle the plate grips the rod against downward movement, halting further angular movement of the plate about its left end portion. A coiled spring 24 seated between the right hand projection of the plate 18 and the right hand end of the plate 20 serves to urge the plate 20 to its maximum angle of inclination to the rod 12 beyond which it cannot move because of the binding engagement at this angle of the plate and rod.

The upper end of rod 12 has fastened to it by a screw 25 a downwardly flanged cup 26 of leather or other flexible material, the rim of which engages the inner surface of the tube 11. When the rod 12 is otherwise free to fall and begins to fall, the cup 26 tends to maintain a partial vacuum in the void 27 between the cup 26 and lower face of the head 13, breaking the fall of the rod and the lighting equipment or other object at its lower end, to a movement at a slow, safe speed. Leakage of air around the shank of the screw 25 and the cup flange will prevent excessive slow-down or a complete cessation of the downward movement of the rod 12. The void 28 between the tube 11 and rod 12, if the bushing 19 is machined to form a close fitting sliding joint with the rod, will assist in steadying the drop of the rod 12 by the compressive stress exerted upon the cup 26.

A lamp or other object 29 (indicated in fragmentary phantom fashion at the lower portion of Figure 1 of the drawing) may be supportedly secured to the rod 12 in any suitable manner, preferably so that it can be readily applied to and removed from the rod.

The operation of the hanger is apparent from the above description of its construction. To elevate the lamp 29, it is manually pushed upward. The rod 12 will move the plate 20 very slightly upward against the action of the spring 24, freeing the rod 12 and allowing it to slide freely upwardly within the walls of the aperture 23. When the lamp is at its proper altitude, the lifting pressure is terminated and the weight of the plate 20 augmented by the force of the spring 24 moves the plate again to the binding position and stops the fall of the rod and lamp.

To lower the lamp, manually press upwardly on the right end of the plate 20, compressing the spring 24 and bringing the side walls of the aperture 23 nearer into parallelism with the rod axis, thus destroying the binding action of the plate upon the rod. The lamp begins to fall, but is checked against too rapid a descent by the leather cup 26. As it slowly falls the operator may check its downward movement at exactly the desired location by stopping upward pressure on plate 20.

As heretofore stated, the invention is not limited to lamp hangers or to hangers for use in studios, but is applicable to any overhead supported, vertically adjustable hanger, especially for use with objects too heavy for manually controlled vertical adjusting movements.

I claim:

A hanger comprising in combination: a tube having means at its upper end for securing it to an overhead support; a rod movable longitudinally within the tube, and projecting downwardly therefrom for supporting a utility article; a manually releasable grip automatically operable by the downward pull of the rod and supported article for holding the rod against downward movement relative to the tube, at any relative position of rod and tube while permitting an upward thrust movement of the rod; means at the upper end portion of said tube forming a substantially air tight closure thereacross to provide a pneumatic cylinder closed at the top, and closure means on the upper end portion of said rod including a packing element pneumatically sealingly engaging the inside surface of said tube for closing said pneumatic cylinder at the level of the upper end portion of said rod, in such manner as to form a pneumatic chamber, closed at the top of said tube, and closed at the upper end of said rod, in which a partial vacuum will be developed upon downward travel of said rod.

JESS C. ROSE.

References Cited in the file of this patent

UNITED STATES PATENTS

| Number | Name | Date |
|---|---|---|
| 143,765 | Hull | Oct. 21, 1873 |
| 227,526 | Hegarty | May 11, 1880 |
| 829,892 | Rieflin | Aug. 28, 1906 |
| 2,051,969 | Shastock | Aug. 25, 1936 |
| 2,467,842 | Marx | Apr. 19, 1949 |

FOREIGN PATENTS

| Number | Country | Date |
|---|---|---|
| 79,045 | Germany | Apr. 19, 1894 |